United States Patent
Schofield

(10) Patent No.: US 7,972,045 B2
(45) Date of Patent: Jul. 5, 2011

(54) AUTOMATIC HEADLAMP CONTROL SYSTEM

(75) Inventor: Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 397 days.

(21) Appl. No.: 12/377,054

(22) PCT Filed: Aug. 10, 2007

(86) PCT No.: PCT/US2007/075702
§ 371 (c)(1),
(2), (4) Date: Feb. 10, 2009

(87) PCT Pub. No.: WO2008/024639
PCT Pub. Date: Feb. 28, 2008

(65) Prior Publication Data
US 2010/0214791 A1    Aug. 26, 2010

Related U.S. Application Data

(60) Provisional application No. 60/837,408, filed on Aug. 11, 2006, provisional application No. 60/845,381, filed on Sep. 18, 2006.

(51) Int. Cl.
*B60Q 1/00* (2006.01)
(52) U.S. Cl. ........................................ 362/466; 362/455
(58) Field of Classification Search .................. 362/465, 362/466
See application file for complete search history.

(56) References Cited

U.S. PATENT DOCUMENTS

| 2,632,040 A | 3/1953 | Rabinow |
| 2,827,594 A | 3/1958 | Rabinow |
| 3,141,393 A | 7/1964 | Platt |
| 3,601,614 A | 8/1971 | Platzer |
| 3,612,666 A | 10/1971 | Rabinow |
| 3,665,224 A | 5/1972 | Kelsey |

(Continued)

FOREIGN PATENT DOCUMENTS

DE    2133182    1/1973
(Continued)

OTHER PUBLICATIONS

Hamit, Francis "360-Degree Interactivity: New Video and Still Cameras Provide a Global Roaming Viewpoint", *Advanced Imaging*, Mar. 1997, p. 50.

(Continued)

*Primary Examiner* — David V Bruce
(74) *Attorney, Agent, or Firm* — Van Dyke, Gardner, Linn & Burkhart, LLP

(57) ABSTRACT

A vehicle headlamp control system includes an imaging sensor and a control. The control processes data from the imaging sensor and generates at least one control output. Selection of a high beam state and a low beam state for a vehicle headlamp is responsive to the control output, and is determined responsive to a detection of an object of interest. The control is responsive to a signal indicative of a vehicle speed of the controlled vehicle, and inhibits adjustment of the vehicle headlamp from a low beam state to a high beam state when the vehicle speed is below a threshold speed level. The control is responsive to data indicative of a vehicle trajectory of the controlled vehicle, and inhibits adjustment of the vehicle headlamp from a low beam state to a high beam state when a radius of curvature of the vehicle trajectory is below a threshold value.

15 Claims, 9 Drawing Sheets

U.S. PATENT DOCUMENTS

| | | |
|---|---|---|
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie ............... 350/302 |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama ............... 350/458 |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. ............... 318/444 |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,603,946 A | 8/1986 | Kato |
| 4,614,415 A | 9/1986 | Hyatt |
| 4,620,141 A | 10/1986 | McCumber et al. .......... 318/483 |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,647,161 A | 3/1987 | Muller ............... 350/462 |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,727,290 A | 2/1988 | Smith et al. |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. ............... 356/237 |
| 4,871,917 A | 10/1989 | O'Farrell et al. |
| 4,872,051 A | 10/1989 | Dye |
| 4,881,019 A | 11/1989 | Shiraishi et al. |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. ............... 430/321 |
| 4,896,030 A | 1/1990 | Miyaji |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. ............... 350/162.17 |
| 5,027,001 A | 6/1991 | Torbert ............... 307/10.1 |
| 5,027,200 A | 6/1991 | Petrossian et al. |
| 5,044,706 A | 9/1991 | Chen ............... 359/357 |
| 5,055,668 A | 10/1991 | French |
| 5,059,877 A | 10/1991 | Teder ............... 318/444 |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi |
| 5,124,549 A | 6/1992 | Michaels et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,182,502 A | 1/1993 | Slotkowski et al. |
| 5,184,956 A | 2/1993 | Langlais et al. |
| 5,193,029 A | 3/1993 | Schofield |
| 5,204,778 A | 4/1993 | Bechtel |
| 5,208,701 A | 5/1993 | Maeda ............... 359/574 |
| 5,245,422 A | 9/1993 | Borcherts et al. |
| 5,253,109 A | 10/1993 | O'Farrell |
| 5,276,389 A | 1/1994 | Levers |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers ............... 318/444 |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,406,395 A | 4/1995 | Wilson et al. ............... 359/15 |
| 5,410,346 A | 4/1995 | Saneyoshi et al. |
| 5,414,257 A | 5/1995 | Stanton ............... 250/227.25 |
| 5,414,461 A | 5/1995 | Kishi et al. ............... 348/115 |
| 5,416,318 A | 5/1995 | Hegyi |
| 5,424,952 A | 6/1995 | Asayama ............... 364/443 |
| 5,426,294 A | 6/1995 | Kobayashi et al. |
| 5,430,431 A | 7/1995 | Nelson |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. ........ 250/227.25 |
| 5,510,983 A | 4/1996 | Iino |
| 5,515,448 A | 5/1996 | Nishitani |

| | | | |
|---|---|---|---|
| 5,528,698 A | 6/1996 | Kamei et al. | |
| 5,529,138 A | 6/1996 | Shaw et al. | |
| 5,530,420 A | 6/1996 | Tsuchiya et al. | 340/435 |
| 5,535,314 A | 7/1996 | Alves et al. | |
| 5,537,003 A | 7/1996 | Bechtel et al. | |
| 5,539,397 A | 7/1996 | Asanuma et al. | |
| 5,541,590 A | 7/1996 | Nishio | |
| 5,550,677 A | 8/1996 | Schofield et al. | 359/604 |
| 5,555,312 A | 9/1996 | Shima et al. | |
| 5,555,555 A | 9/1996 | Sato et al. | |
| 5,568,027 A | 10/1996 | Teder | |
| 5,574,443 A | 11/1996 | Hsieh | |
| 5,614,788 A | 3/1997 | Mullins et al. | |
| 5,634,709 A | 6/1997 | Iwama | |
| 5,648,835 A | 7/1997 | Uzawa | 396/429 |
| 5,650,944 A | 7/1997 | Kise | |
| 5,660,454 A | 8/1997 | Mori et al. | |
| 5,661,303 A | 8/1997 | Teder | 250/341.8 |
| 5,670,935 A | 9/1997 | Schofield et al. | 340/461 |
| 5,675,489 A | 10/1997 | Pomerleau | |
| 5,757,949 A | 5/1998 | Kinoshita et al. | |
| 5,760,826 A | 6/1998 | Nayar | 348/36 |
| 5,760,828 A | 6/1998 | Cortes | 348/143 |
| 5,760,931 A | 6/1998 | Saburi et al. | |
| 5,760,962 A | 6/1998 | Schofield et al. | |
| 5,765,116 A | 6/1998 | Wilson-Jones et al. | |
| 5,781,437 A | 7/1998 | Wiemer et al. | |
| 5,790,403 A | 8/1998 | Nakayama | |
| 5,793,308 A | 8/1998 | Rosinski et al. | |
| 5,793,420 A | 8/1998 | Schmidt | |
| 5,796,094 A | 8/1998 | Schofield et al. | 250/208.1 |
| 5,798,575 A | 8/1998 | O'Farrell et al. | |
| 5,837,994 A * | 11/1998 | Stam et al. | 362/466 |
| 5,844,682 A | 12/1998 | Kiyomoto et al. | |
| 5,845,000 A | 12/1998 | Breed et al. | |
| 5,848,802 A | 12/1998 | Breed et al. | |
| 5,850,176 A | 12/1998 | Kinoshita et al. | 340/435 |
| 5,850,254 A | 12/1998 | Takano et al. | |
| 5,867,591 A | 2/1999 | Onda | 382/154 |
| 5,877,897 A | 3/1999 | Schofield et al. | |
| 5,883,739 A | 3/1999 | Ashihara et al. | 359/462 |
| 5,890,021 A | 3/1999 | Onoda | 396/121 |
| 5,896,085 A | 4/1999 | Mori et al. | 340/469 |
| 5,923,027 A | 7/1999 | Stam et al. | 250/208.1 |
| 5,949,331 A | 9/1999 | Schofield et al. | 340/461 |
| 5,959,555 A | 9/1999 | Furuta | |
| 5,963,247 A | 10/1999 | Banitt | |
| 5,990,469 A | 11/1999 | Bechtel et al. | 250/208.1 |
| 6,020,704 A | 2/2000 | Buschur | 318/483 |
| 6,049,171 A | 4/2000 | Stam et al. | 315/82 |
| 6,066,933 A | 5/2000 | Ponziana | |
| 6,084,519 A | 7/2000 | Coulling et al. | |
| 6,087,953 A | 7/2000 | DeLine et al. | 340/815.4 |
| 6,097,023 A | 8/2000 | Schofield et al. | |
| 6,097,024 A | 8/2000 | Stam et al. | 250/208.1 |
| 6,124,886 A | 9/2000 | DeLine et al. | 348/148 |
| 6,144,022 A | 11/2000 | Tenenbaum et al. | 250/208.1 |
| 6,172,613 B1 | 1/2001 | DeLine et al. | 340/815.4 |
| 6,201,642 B1 | 3/2001 | Bos | 359/565 |
| 6,222,447 B1 | 4/2001 | Schofield et al. | 340/461 |
| 6,243,003 B1 | 6/2001 | DeLine et al. | |
| 6,255,639 B1 | 7/2001 | Stam et al. | |
| 6,302,545 B1 | 10/2001 | Schofield et al. | |
| 6,313,454 B1 | 11/2001 | Bos et al. | |
| 6,320,176 B1 | 11/2001 | Schofield et al. | |
| 6,396,397 B1 | 5/2002 | Bos et al. | |
| 6,411,328 B1 | 6/2002 | Franke et al. | |
| 6,424,273 B1 | 7/2002 | Gutta et al. | 340/937 |
| 6,433,676 B2 | 8/2002 | DeLine et al. | |
| 6,442,465 B2 | 8/2002 | Breed et al. | |
| 6,498,620 B2 | 12/2002 | Schofield et al. | |
| 6,523,964 B2 | 2/2003 | Schofield et al. | |
| 6,534,884 B2 | 3/2003 | Marcus et al. | 307/10.1 |
| 6,553,130 B1 | 4/2003 | Lemelson et al. | 382/104 |
| 6,559,435 B2 | 5/2003 | Schofield et al. | |
| 6,611,202 B2 | 8/2003 | Schofield et al. | |
| 6,636,258 B2 | 10/2003 | Strumolo | 348/149 |
| 6,650,233 B2 | 11/2003 | DeLine et al. | |
| 6,672,731 B2 | 1/2004 | Schnell et al. | 359/877 |
| 6,717,610 B1 | 4/2004 | Bos et al. | 348/148 |
| 6,802,617 B2 | 10/2004 | Schofield et al. | |
| 6,822,563 B2 | 11/2004 | Bos et al. | |
| 6,831,261 B2 | 12/2004 | Schofield et al. | |
| 6,891,563 B2 | 5/2005 | Schofield et al. | |
| 6,953,253 B2 | 10/2005 | Schofield et al. | |
| 6,975,775 B2 | 12/2005 | Rykowski et al. | |
| 7,062,300 B1 | 6/2006 | Kim | |
| 7,227,459 B2 | 6/2007 | Bos et al. | |
| 7,459,664 B2 | 12/2008 | Schofield et al. | |
| 2002/0015153 A1 | 2/2002 | Downs | |
| 2002/0126875 A1 | 9/2002 | Naoi et al. | |
| 2004/0016870 A1* | 1/2004 | Pawlicki et al. | 250/208.1 |
| 2004/0051634 A1 | 3/2004 | Schofield et al. | |
| 2004/0114381 A1 | 6/2004 | Salmeen et al. | |
| 2004/0200948 A1 | 10/2004 | Bos et al. | |
| 2005/0146792 A1 | 7/2005 | Schofield et al. | |
| 2005/0200700 A1 | 9/2005 | Schofield et al. | |
| 2005/0219852 A1 | 10/2005 | Stam et al. | |
| 2006/0018511 A1 | 1/2006 | Stam et al. | |
| 2006/0018512 A1 | 1/2006 | Stam et al. | |
| 2006/0028731 A1 | 2/2006 | Schofield et al. | |
| 2006/0091813 A1 | 5/2006 | Stam et al. | |
| 2007/0023613 A1 | 2/2007 | Schofield et al. | |
| 2007/0109406 A1 | 5/2007 | Schofield et al. | |
| 2007/0109651 A1 | 5/2007 | Schofield et al. | |
| 2007/0109652 A1 | 5/2007 | Schofield et al. | |
| 2007/0109653 A1 | 5/2007 | Schofield et al. | |
| 2007/0109654 A1 | 5/2007 | Schofield et al. | |
| 2007/0120657 A1 | 5/2007 | Schofield et al. | |
| 2007/0176080 A1 | 8/2007 | Schofield et al. | |
| 2010/0082564 A1* | 4/2010 | Fernekes | 707/705 |

FOREIGN PATENT DOCUMENTS

| | | |
|---|---|---|
| DE | 2808260 | 8/1979 |
| DE | 3041612 | 11/1980 |
| DE | 2946561 A | 5/1981 |
| DE | 3041692 | 5/1981 |
| DE | 3248511 A1 | 7/1984 |
| DE | 4107965 A1 | 9/1991 |
| DE | 4118208 | 11/1991 |
| DE | 4139515 A1 | 6/1992 |
| DE | 4123641 A1 | 1/1993 |
| EP | 48506 | 6/1985 |
| EP | 0202460 | 11/1986 |
| EP | 48810 | 10/1988 |
| EP | 0416222 A2 | 3/1991 |
| EP | 0426503 | 5/1991 |
| EP | 0450553 A2 | 10/1991 |
| EP | 0492591 | 7/1992 |
| EP | 0513476 A1 | 11/1995 |
| EP | 0788947 | 8/1997 |
| EP | 0830267 B1 | 12/2001 |
| FR | 2241085 | 4/1973 |
| FR | 2513198 | 3/1983 |
| FR | 2585991 | 2/1987 |
| FR | 2 641 237 A1 | 7/1990 |
| FR | 2672857 | 8/1992 |
| FR | 2673499 | 9/1992 |
| FR | 2726144 | 4/1996 |
| GB | 934037 | 8/1963 |
| GB | 1535182 | 12/1978 |
| GB | 2029343 | 3/1980 |
| GB | P2931368 A1 | 2/1981 |
| GB | 2119087 | 11/1983 |
| GB | 2137373 | 10/1984 |
| GB | 2137573 A | 10/1984 |
| GB | 2156295 | 10/1985 |
| GB | 2244187 A | 11/1991 |
| GB | 2255539 A | 11/1992 |
| GB | 2327823 A | 2/1999 |
| JP | 5630305 | 8/1979 |
| JP | 55039843 | 3/1980 |
| JP | 57-173801 | 10/1982 |
| JP | 57-208530 | 12/1982 |
| JP | 58-19941 | 12/1982 |
| JP | 57-208531 | 2/1983 |
| JP | 58110334 | 6/1983 |
| JP | 58209635 | 12/1983 |

| | | |
|---|---|---|
| JP | 59-51325 | 3/1984 |
| JP | 5951301 | 4/1984 |
| JP | 59114139 | 7/1984 |
| JP | 59133336 | 9/1984 |
| JP | 6080953 | 5/1985 |
| JP | 0-212730 | 10/1985 |
| JP | 60166651 | 11/1985 |
| JP | 60261275 | 12/1985 |
| JP | 6154942 | 4/1986 |
| JP | 6156638 | 4/1986 |
| JP | 6243543 | 2/1987 |
| JP | 62-131837 | 6/1987 |
| JP | 62122487 | 6/1987 |
| JP | 62122844 | 6/1987 |
| JP | 6414700 | 1/1989 |
| JP | 01123587 | 5/1989 |
| JP | 03061192 | 3/1991 |
| JP | 03099952 | 4/1991 |
| JP | 04239400 | 11/1991 |
| JP | 3284413 | 12/1991 |
| JP | 4114587 | 4/1992 |
| JP | 40245886 | 9/1992 |
| JP | 50000638 | 1/1993 |
| JP | 0550883 | 3/1993 |
| JP | 0577657 | 3/1993 |
| JP | 5213113 | 8/1993 |
| JP | 6107035 | 4/1994 |
| JP | 6227318 | 8/1994 |
| JP | 06-267304 | 9/1994 |
| JP | 06276524 A | 9/1994 |
| JP | 06-295601 | 10/1994 |
| JP | 074170 | 1/1995 |
| JP | 7-32936 | 2/1995 |
| JP | 7-47878 | 2/1995 |
| JP | 7-052706 | 2/1995 |
| JP | 7-69125 | 3/1995 |
| JP | 07105496 | 4/1995 |
| JP | 08166221 | 6/1996 |
| JP | 2630604 | 4/1997 |
| WO | WO 86/05147 | 9/1986 |
| WO | WO-9419212 A | 9/1994 |
| WO | 9427262 | 11/1994 |
| WO | WO 9621581 A | 7/1996 |
| WO | 9638319 | 12/1996 |
| WO | WO 9735743 | 10/1997 |
| WO | 9814974 | 4/1998 |
| WO | 9914088 | 3/1999 |
| WO | 9923828 | 5/1999 |

OTHER PUBLICATIONS

Johannes, Laura "A New Microchip Ushers In Cheaper Digital Cameras", *The Wall Street Journal*, Aug. 21, 1998, p. B1.

Article entitled "Generation of Vision Technology," published by VLSI Vision Limited, publication date unknown.

Article entitled "On-Chip CMOS Sensors for VLSI Imaging Systems," published by VLSI Vision Limited, 1991.

Wang, G., et al. "CMOS Video Cameras", IEEE, 1991, p. 100-103.

Ballard, Dana H. et al., "Computer Vision", 1982, p. 88-89, sect. 3.4.1.

Decision—Motions—Bd. R. 125(a), issued Aug. 29, 2006 in connection with Interference No. 105,325, which involved U.S. Appl. No. 09/441,341, filed Nov. 16, 1999 by Schofield et al. and U.S. Patent No. 5,837,994, issued to Stam et al.

Reexamination U.S. Appl. No. 90/007,519, Reexamination of U.S. Patent No. 6,222,447, issued to Schofield et al.

Reexamination U.S. Appl. No. 90/007,520, Reexamination of U.S. Patent No. 5,949,331, issued to Schofield et al.

International Search Report dated Sep. 12, 2008 for corresponding PCT Application No. PCT/US2007/075702, filed Aug. 10, 2007.

International Preliminary Report on Patentability for corresponding PCT Application No. PCT/US2007/075702, filed Aug. 10, 2007, date Feb. 26, 2009.

\* cited by examiner

AUTOMATIC HEADLAMP CONTROL SYSTEM

CROSS REFERENCE TO RELATED APPLICATIONS

The present application claims the benefit of U.S. provisional applications, Ser. No. 60/845,381, filed Sep. 18, 2006; and Ser. No. 60/837,408, filed Aug. 11, 2006, which are hereby incorporated herein by reference in their entireties.

FIELD OF THE INVENTION

The present invention relates to automatic headlamp control systems for vehicles and, more particularly, to automatic headlamp control systems that automatically adjust the high and low beam states of a vehicle headlamp.

BACKGROUND OF THE INVENTION

Automotive forward lighting systems are evolving in several areas including the use of image-based sensors, typically referred to as Automatic High Beam (AHB) control systems, to maximize the use of high beam road illumination when appropriate, the use of steerable beam systems, typically referred to as Adaptive Front Lighting (AFL) systems, to provide a greater range of beam pattern options particularly for driving on curved roads or during turn maneuvers wherein the beam pattern may be biased or supplemented in the direction of the curve or turn, and the combination of such AHB and AFL systems.

U.S. Pat. No. 6,097,023 (which is hereby incorporated herein by reference in its entirety) describes an automatic high beam control system which utilizes an optical system, an image sensor, and signal processing including spectral, spatial and temporal techniques to determine ambient lighting conditions, the road environment, and the presence of other road users in order to automatically control the selection of the appropriate forward lighting state such that user forward vision is optimized while minimizing the impact of headlamp caused glare on other road users in all lighting conditions.

While AHB systems that utilize the features and concepts described within the above identified U.S. patent have achieved performance levels that have resulted in considerable commercial success, it is desired to provide additional features and techniques, which may increase the utility, improve the performance, facilitate the manufacture, and simplify the installation of such systems.

SUMMARY OF THE INVENTION

The present invention provides an automatic headlamp control system that is operable to automatically control or adjust the high beam state of a vehicle's headlamps. The headlamp control system is operable to spread out or de-focus a captured image to spread out the imaging of a light source so that an image of a distant light source is captured by at least two pixels of an image array sensor. The image array sensor thus may receive at least a portion of the light source (which may be a red tail light of a leading vehicle) on a red sensing pixel to enhance early detection of the distance tail light. The headlamp control system may provide enhanced control of the headlamps when the vehicle is driven around curves or bends in the road and may be operable in response to a steering wheel angle of the vehicle. The headlamp control system may be adjustable to align the optical axis of the imaging system with a vehicle axis in response to detection of light sources and tracking of movement of the light sources as the vehicle travels along the road.

These and other objects, advantages, purposes and features of the present invention will become apparent upon review of the following specification in conjunction with the drawings.

DESCRIPTION OF THE PREFERRED EMBODIMENTS

In order to facilitate the description of features and enhancements, some specific configurations, to be reviewed in conjunction with the drawings, is described below. It will be understood that the components and values described are for illustrative purposes and do not limit the scope of the disclosed invention.

Figure 1:
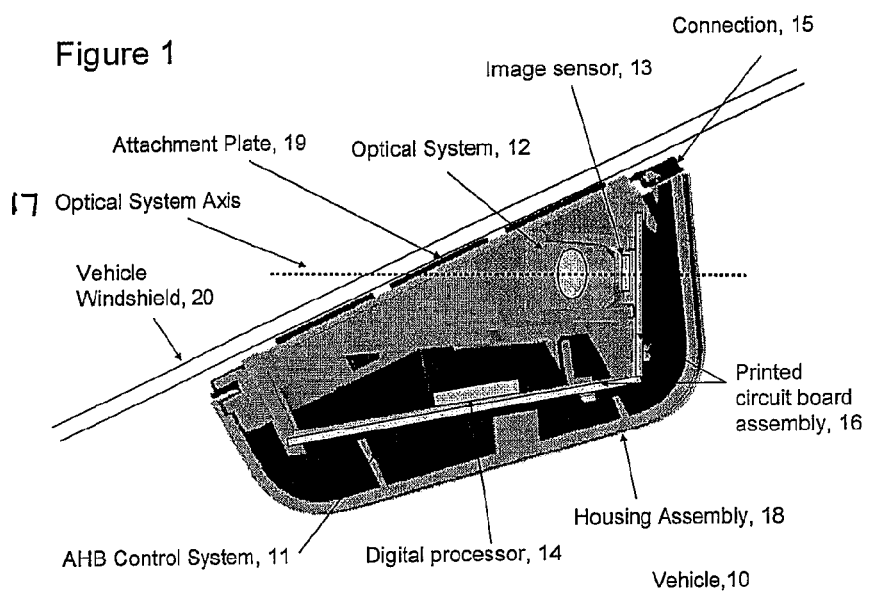
FIG. 1 is a sectional view of an accessory module and image sensing device and processor in accordance with the present invention.
Figure 2:
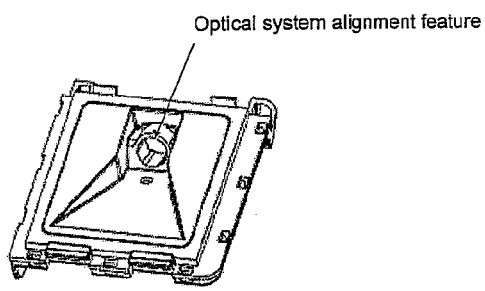
FIG. 2 is a perspective view of the accessory module as seen through the windshield of a vehicle.

With reference to FIG. 1, a vehicle 10 includes an automatic high beam control system 11 made up of an optical system 12, an image sensor 13, a digital processor 14, a printed circuit board assembly 15, which contains all the necessary electronic components and interconnections to support operation of the image sensor 13 and digital processor 14, a connection 16 to the vehicle wiring system, and a housing assembly or accessory module or windshield electronics module 18.

The optical system 12 is held by features of the housing assembly 18 in a constrained spatial relationship with the image sensor 13, such that an optical system axis 17 is perpendicular to the active plane of the image sensor 13 and passes generally through its center point, and such that the distance between the optical system 12 and the image sensor 13 may be adjusted to bring the optical system focal plane into a predetermined relationship with the active plane of the image sensor 13 during the manufacturing process and thereafter locked in position. The housing assembly may utilize aspects of the modules or assemblies described in U.S. Pat. Nos. 6,968,736; 6,877,888; 6,824,281; 6,690,268; 6,672,744; 6,593,565; 6,516,664; 6,501,387; 6,428,172; 6,386,742; 6,341,523; 6,329,925; and 6,326,613; 6,250,148; and 6,124,886, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/538,724, filed Jun. 13, 2005 by Hutzel et al. for ACCESSORY SYSTEM FOR VEHICLE, and/or Ser. No. 11/201,661, filed Aug. 11, 2005 by DeWard et al. for ACCESSORY MODULE FOR VEHICLE, now U.S. Pat. No. 7,480,149, and/or PCT Application No. PCT/US03/40611, filed Dec. 19, 2003 by Donnelly Corp. et al. for ACCESSORY SYSTEM FOR VEHICLE; PCT Application No. PCT/US03/03012, filed Jan. 31, 2003 by Donnelly Corporation for VEHICLE ACCESSORY MODULE, and/or PCT Application No. PCT/US04/15424, filed May 18, 2004 by Donnelly Corporation et al. for MIRROR ASSEMBLY FOR VEHICLE, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

The accessory module or housing assembly 18 includes an outer housing 18a that is removably attached to an attachment plate 19, which is fixedly attached to the upper central region of the inside surface of the vehicle's windshield 20 such that the optical system axis 17 is substantially horizontal and substantially parallel to the vehicle's principal central axis. The housing assembly and attachment plate. Preferably, the housing assembly 18 is positioned at the windshield such that the light rays that pass through the optical system 12 to the image sensor 13 also pass through a portion of the vehicle's windshield swept by the vehicle's windshield wiper system.

Figures 3, 4:
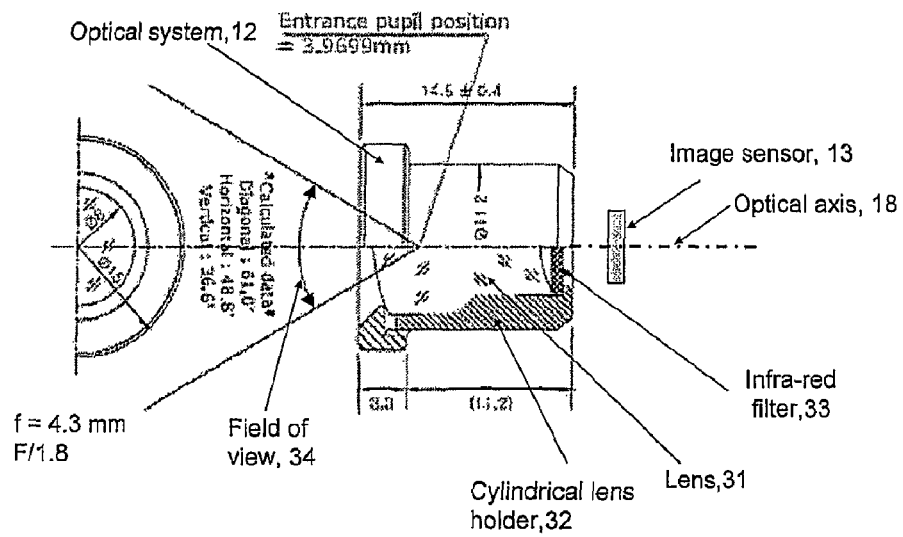
FIG. 3 is a side elevation and partial sectional view of an image sensing device useful with the present invention.
FIG. 4 is a plan view of an array of photo sensors of an image sensing device of the present invention.

As shown in FIG. 3, optical system 12 includes a lens 31, or combination of lenses or optical elements, with a focal length f (such as a focal length of, for example, about 4.5 mm), an optical stop, N (such as an optical stop of, for example, about 1.8) and a spherical field of view (FOV) 34 (such as about 60 degrees). Optical system 12 also includes a cylindrical lens holder 32, an infrared filter 33, and an image sensor 13 positioned with its active surface perpendicular to optical axis 17. The infrared filter 33 facilitates the determination of color attributes within the visible light spectrum of objects within the monitored scene by preventing near infrared energy, with a wavelength above about 750 nm, from reaching the image sensor 13, and may be optionally placed at the front (object side) or back (image side) of the optical system 12, between the optical system 12 and image sensor 13, or on the surface of the image sensor 13. The optical system and lens holder and sensor may be located at an imaging sensor module, such as by utilizing aspects of the modules described in U.S. patent application Ser. No. 10/534,632, filed May 11, 2005 by Bingle et al. for IMAGING SYSTEM FOR VEHICLE, and/or U.S. provisional application Ser. No. 60/731,183, filed Oct. 28, 2005 by Gibson for CAMERA MODULE FOR VEHICLE VISION SYSTEM, which are hereby incorporated herein by reference in their entireties.

The image sensor 13 is preferably, but not limited to, a CMOS photosensor array, such as part number MT9V125 produced by Micron Corporation, with 640 rows and 480 columns of 5.6 micron square photosensor elements and circuitry to measure the quantity of photons that impinge each photosensor element during a controllable period of time. In the described configuration, the image sensor is oriented such that the 640 photosensor rows are horizontal and the 480 columns are vertical. Thus, in combination with the optical system 12, the image sensor 13 has about a 48 degree horizontal field of view and about a 36 degree vertical field of view.

In order to extract color information from the image or image data, one of a number of filter types, each able to transmit a particular band of wavelength, covers the active surface of each of the photosensor elements of the array. The most commonly used color filter pattern, and therefore the most economically available as a standard feature of a commercially available image sensor, is the Bayer pattern in which either a blue, green or red pass filter is applied to the surface of each of the image sensor photosensor elements, such as shown in FIG. 4. Alternate rows of the photosensor elements may be covered by alternating red and green filters and alternating blue and green filters such that every 2 by 2 block of photosensors within the array contains one red filter, one blue filter and two diagonally opposite green filters. Since each photosensor is filtered to measure only the blue, green or red light energy content of the portion of the image formed by the optical system at its active surface, it is necessary to combine the measured values of filtered light from each of the photosensors of a 2 by 2 block such that an interpolated red, green and blue color value (RGB) may be assigned to the center point of the block. The color value for each of the 2 by 2 blocks of the array is calculated, thus creating a 639 by 479 array of color values with the same spacing as the photosensor array. This array of color picture elements is commonly termed a pixel array. A variety of algorithms may be used to perform this interpolation, commonly termed demosaicing, and the particular algorithm may be selected depending on the particular the application, the desired final image quality and available computing power. For the AHB control system described herein, each pixel RGB value is derived by combining the red value, the average of the two green values, and the blue value of its associated four photosensor elements.

Figure 15A:
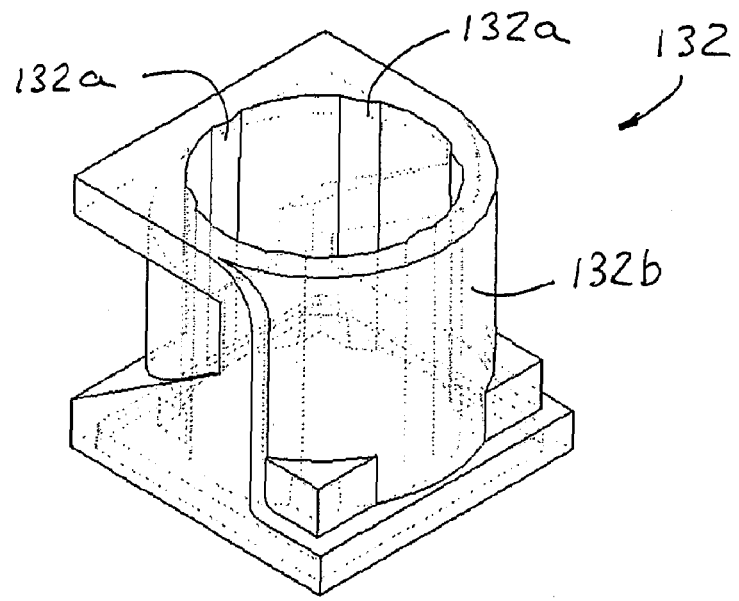
FIG. 15A is a perspective view of a lens holder in accordance with the present invention.
Figure 15B:
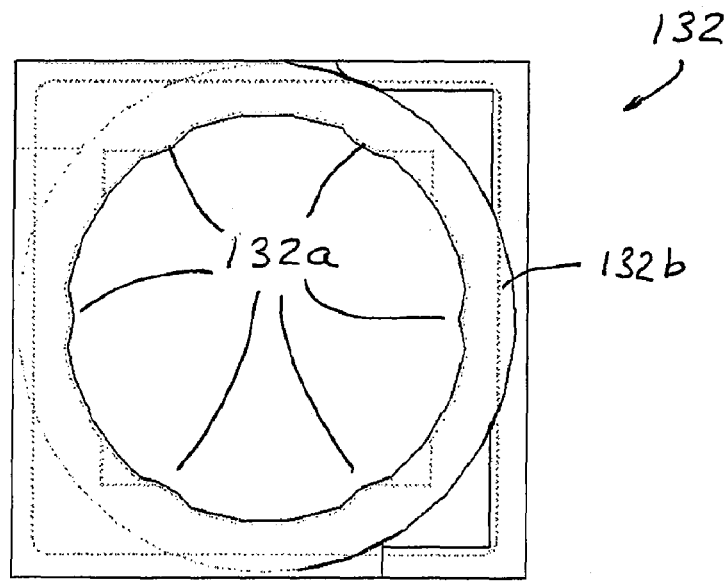
FIG. 15B is a plan view of the lens holder of FIG. 15A.

Optionally, the imaging device or module may comprise an imaging or intelligent headlamp control (IHC) module. For example, a intelligent headlamp control module may have a dimensionally small cavity around a lens holder 132 (FIGS. 15A and 15B), thus making threaded lens insertion very difficult in an automated lens insertion situation. In order to manufacture such an IHC module or lens holder 132, crush ribs 132a may be disposed or established at an interior surface of the barrel 132b of the lens holder. By introducing vertical crush ribs to the barrel, the axes of motion are decreased to one. In a threaded lens situation, the automated lens insertion procedure could have as many as four axis of motion, thus increasing the cost of the module or system.

In order to accommodate the crush ribs, several lens modifications may be needed, since a typical existing lens often has threads which may bind in the crush ribs. Thus, in order to accommodate the crush ribs, the lens may be manufactured or modified to have a smooth bore in order to engage the control surfaces of the ribs evenly along the barrel of the lens holder.

The crush rib feature of the lens holder secures the lens during manufacture. However, it is desirable to apply an adhesive at the lens holder and lens to substantially permanently attach the lens to the plastic barrel of the lens holder. Lateral grooves around the barrel of the lens may be provided to allow the flow of adhesive around the lens for a more uniform lens attachment or securement. Such grooves do not interfere with the crush ribs during insertion as much as threads would and allow the flow of adhesive greater than a substantially smooth bore.

In order to control alignment and precision of the insertion of the lens down the barrel (toward and away from the imager), a gripper may be provided to isolate the head of the lens between two overlapping control surfaces that would hold the lens and control the toward and away (from the imager) motion during the focusing process.

The control surface of the printed circuit board (PCB) during the lens insertion process preferably facilitates several criteria, both mechanical and electrical, during such an automated process. The nest may secure the imager board and backplate simultaneously in a repeatable orientation for lens insertion. The nest may also allow for electrical attachment to the ECU by way of pogo pins or the like during the focusing process. It may also articulate in order to secure the ECU board to the backplate after the focusing process.

In order to achieve enhanced AHB control system performance, it is desirable to detect the tail lamp of a leading vehicle at about 200 meters. The minimum tail light emitting surface area to meet legal requirements is about 50 cm$^2$, which can be achieved using about an 80 mm diameter circular or about a 71 mm square emitting surface. However, in most cases, tail lamp designs are driven by vehicle styling considerations and a desire on the part of vehicle manufacturers to exceed minimum requirements by a safe margin. Such design and styling constraints often result in tail lamp emitting surfaces with either a horizontal or vertical dimension of at least about 125 mm.

Using the above described optical system 12 and imaging array 13, each photosensor element of the array has an effective horizontal field of view FOVph and an effective vertical field of view FOVpv, where:

FOV$ph$=FOV$pv$=48 degrees/640 pixels=0.075 degrees/pixel.

Thus, each photosensor element of the array subtends a region of a vertical plane at distance R meters from the imager, which measures ph by pv where:

$ph$=$pv$=FOV$ph$×R×1000×$PI$/180 mm=1.309×R mm.

Thus, at a distance of about 200 m, the portion of the forward scene subtended by each photosensor element of the array measures about 262 mm by about 262 mm, which is approximately twice the dimension of a typical tail lamp of a vehicle. Since the dimension of the image of a tail lamp at about 200 meters is in the order of half that of a photosensor element, it is possible that the tail lamp image will lie entirely on the blue and green detecting photosensor elements of a 2 by 2 block of photosensor elements, and thus may result in a pixel value with no red content. In order to assure that the red content of the image of the tail lamp at about 200 meters is measured and results in a red component of the calculated pixel color value, it is desirable that the tail lamp image dimension be in the order of about one and a half times that of a photosensor element, such that no matter where it lies or is received on the photosensor array it will cover at least a portion of at least one red detecting photosensor.

This could be achieved by reducing the field of view of the optical system by a factor of about three, resulting in a horizontal field of view of about 16 degrees and a significant reduction in other aspects of system performance. It could also be achieved by increasing the number of photosensor elements in each row of the image sensor by a factor of about three, with a corresponding reduction of photosensor element dimension, or by increasing the number of photosensor elements in each row of the image sensor by a factor of about three, maintaining the photosensor element dimension, and changing the optical system specification in order to maintain about a 48 degree horizontal field of view. However, this is typically not a practical solution due to the cost or availability of such image sensors and the cost of the additional processing capacity required to handle the significantly increased amount of image data.

It is thus an aspect of the present invention to increase the effective size of the image at the image sensor of a tail lamp at 200 meters, so that its presence and color may be detected, without changing the optical system or image sensor and while maintaining the ability to perform other object detection tasks to support additional features and functions, such as described below.

The following analysis of the optical system contained within the AHB control system will serve to explain the principles used to establish an optimal configuration.

Figure 5:
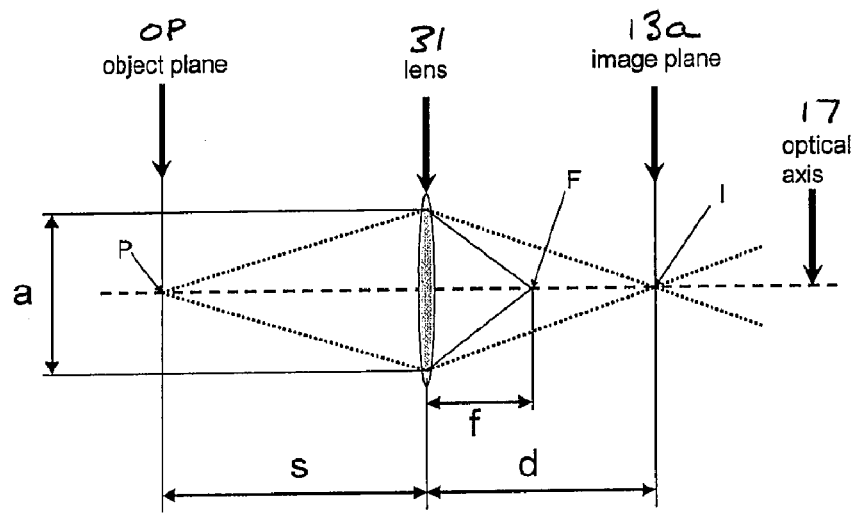
FIG. 5 is a side elevation of a lens and image sensing device of the present invention.

FIG. 5 shows an imaging device having a thin lens 31 with focal length f mm, effective diameter a mm, and optical stop N, where N=f/a. An object plane OP, which is perpendicular to the optical axis of lens 31 and at a distance s mm from its optical center, and an image plane 13a parallel to the object plane at a distance d mm from, and on the opposite side of, the optical center of lens 31. The focal length f is the distance from the optical center of lens 31 to the point at which light rays from a distant point on the optical axis 17 converge. Light rays that pass through lens 31 behave according to the thin lens equation 1/s+1/d=1/f. Thus, an image of the point P on the object plane OP is in focus at point I on the image plane 13a.

Figure 6:
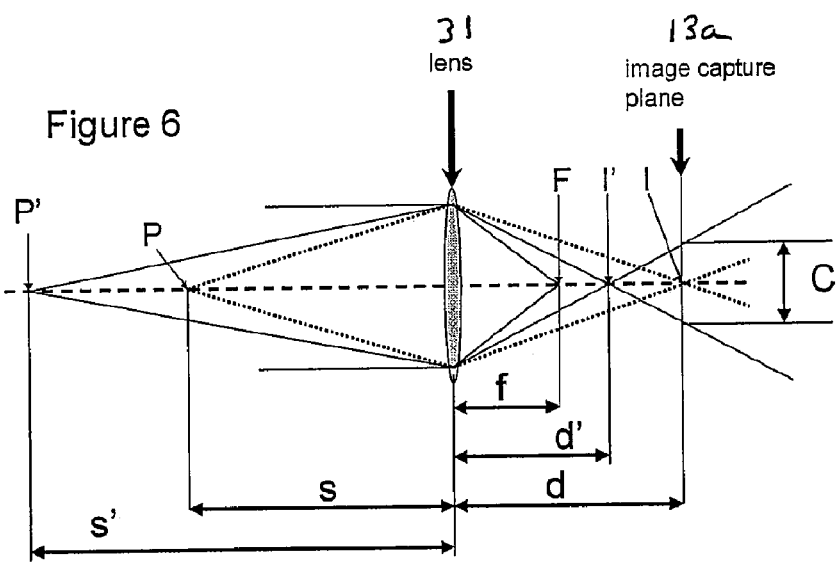
FIG. 6 is another side elevation of a lens and image sensing device similar to FIG. 5.

FIG. 6 shows the same configuration as FIG. 5 with the addition of a point P' at distance s' from the optical center of the lens 31. According to the thin lens equation (1), a focused image of point P' would be formed at point I' which is at distance d' from the optical center of the lens. However, since the image plane 13a has remained at the distance d from the lens, the light rays from point P' continue through point I' and diverge until they reach the image plane 13a resulting in an unfocused image of point P' with diameter C, commonly termed the circle of confusion.

For a thin lens: $1/s+1/d=1/f$ (1)

or: $d=f \times s/(s-f)$ similarly: $d'=f \times s'/(s'-f)$ by similar triangles: $C=a \times (d-d')/d'$ by definition: $a=f/N$ by substitution: $C=f^2 \times (s'-s)/N \times s' \times (s-f)$ (2)

Figure 7:
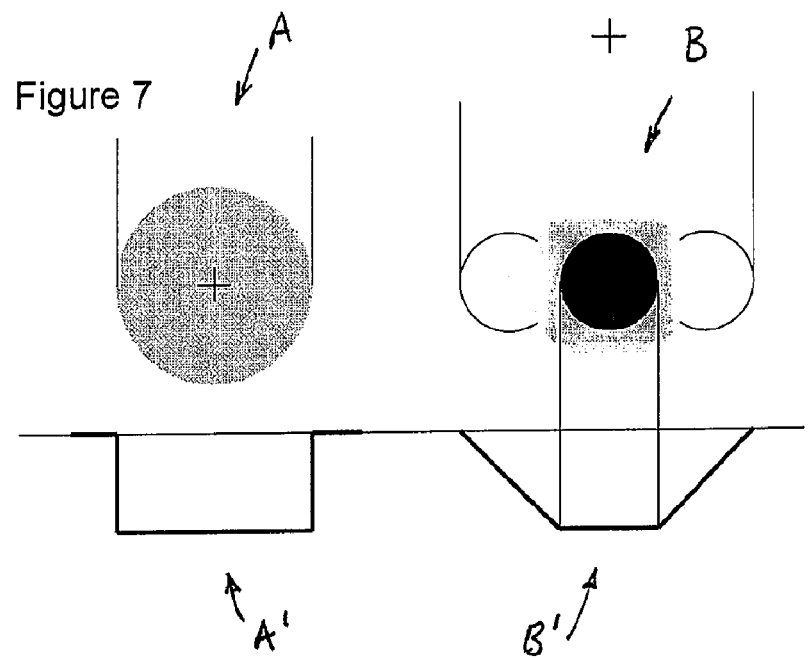
FIG. 7 is a schematic of a focused light source and defocused light source as captured by pixels of an imaging sensor.
Figure 8:
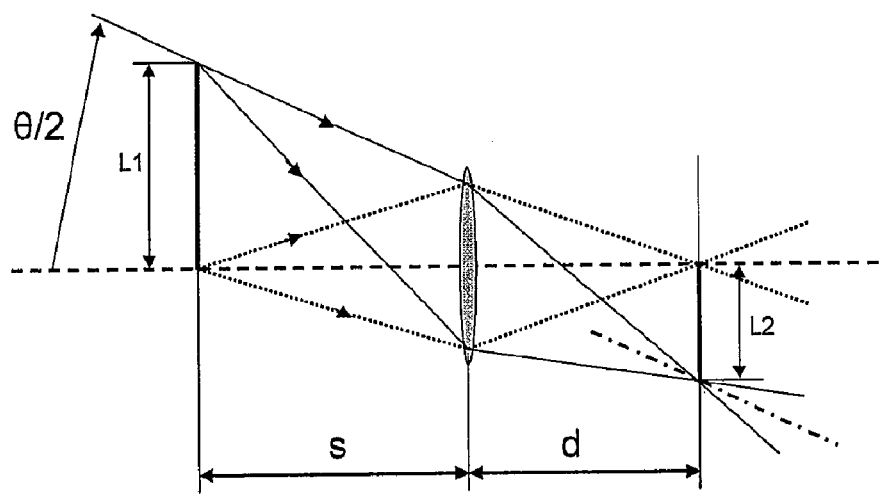
FIG. 8 is a side elevation of a lens and image sensing device of the present invention.

Consider now the object point to be replaced by a circular uniform light source of diameter D. When placed at point P, the image of the disc at the image plane would appear as a focused disc of diameter D' with uniform intensity (such as shown at A in FIG. 7). A plot of image intensity across an extended diametral line would appear as line A' with a step change from background image intensity to disc image intensity. When placed at point P', the previously described circle of confusion, with diameter C, would be created at the image plane 13a for each point on the disc, resulting in an unfocused image of the disc with diameter D", where D"=D'+C (such as shown at B in FIG. 7). A plot of image intensity across an extended diametral line would appear as line B' with gradual change from background intensity to full disc image intensity over a distance equal to the circle of confusion, C.

Rearranging equation (1) to solve for s:

$$s = f \times s' \times (C \times N + f)/(C \times N \times s' + f^2) \quad (3)$$

For the optical system described above, f=4.5 mm and N=1.8. Thus, C=0.0056 mm, s'=200 m, and s=1.933 m. Thus, the same amount of light energy has been distributed over a greater image area. By focusing the lens to focus an image of an object P that is about 1.993 m from the lens, the defocused object P' at about 200 m from the lens will be defocused to have a diameter that will allow the image to be received by more than one pixel of the imaging array sensor or camera. Such an expanded image of the light source (by de-focusing the image of an object at about 200 meters) will be received by more than one pixel and will be at least partially received by a red sensing pixel so that the system can determine whether or not a distant light source is a red light source and thus whether or not the distant light source may be a taillight of a leading vehicle.

Focusing or adjustment of the lens may be performed via any suitable focusing means, such as a linear slide mechanism that has a high resolution motor and controller, such as an MX-80 miniature slide with a Vix 250 IM motion controller commercially available from Parker-Hannifin. Such as slide mechanism and motor may provide a resolution of about 1 μm and a repeatability of about 2 μm or thereabouts. Such characteristics make good resolution possible across the focus range so that the captured image data will illustrate or approximate an enhanced or optimum focus value.

Once an image was loaded by the software, the image may be analyzed by many different means including line profiles and color analysis. For the processing of the image data, a processor system or software, such as Data Translation's DT Vision Foundry©, may be used to analyze the images using software masks or regions of interest (ROI's). The exemplary DT Vision Foundry© software provides an imaging software designed to assist machine vision systems in operation, programming, and data management.

The imaging software was used to process image ROI's using a line profile tool. The line profile tool examines the pixel gain values which the line mask lays. The line profile tool graphically illustrates the gain values across the mask. It also may provide a data export tool which enables the user to view and manipulate the intensity values gathered from the imager.

Figure 11A:
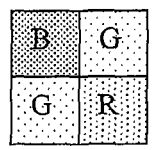
FIGS. 11A-D are schematics of a quad of pixels of an image sensor in accordance with the present invention.

Imager color values are independent to a color pixel. Four pixels in a grid pattern, as shown in FIG. 11A, are often referred to as a "quad". The values taken from the imager are typically intensity or gain values (0 to 255) from the pixels in the quad. There are many different ways in which displays and compilers interpret the intensity values from the imager. The most straight forward way is to collect each pixel's intensity value and compile it into a 64-bit RGGB image. This method of compilation yields enhanced resolution because all of the pixel data is transferred; however, the file sizes may be very large. Many software designers use compression techniques to keep the file sizes lower.

Figure 11B:
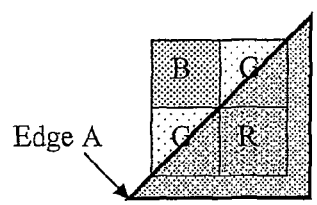
Figure 11C:
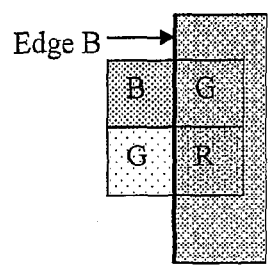
Figure 11D:
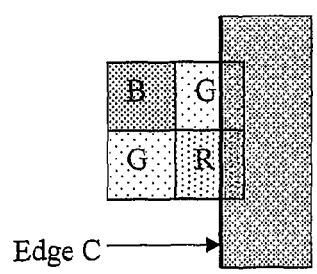

The first method of compression is to get the maximum pixel value from the green pixels in the quad. The second green pixel in the quad is set to the maximum green pixel's value. This method works well in most applications. However, since focus is directly related to the sharpness of the edges of the target in an image, the green pixel values should not be extended to allow the edge to appear sharper than it is. As shown by the edges B and C in FIGS. 11C and 11D, if the edge of the target image lies across the imager in a vertical orientation bisecting the two green pixels of the quad, the second green pixel is then set to the maximum green pixel. This allows for a false edge to be seen by the image processing software. One way that the quad detects the edge correctly is if the edge of a target bisects the green pixels of the quad evenly, as shown by edge A in FIG. 11B. To counter this effect, software designers often average the green pixels together to allow the pixel to take into account the pixel effected by the edge of a target image.

While some visual resolution may be lost by averaging the green pixels, for matters of image processing the data is typically more telling. If the target image edge falls on the imager, such as edge B or C of FIGS. 11C and 11D, the value will be less than the maximum value because the green pixels in the quad are averaged. By examining the difference in intensity value of the quads either side of the averaged edge quad, the edge location within the quad can be approximated.

Focus is directly related to the sharpness of the edges of the target image. Optionally, two image processing tools may be used: a histogram and a line profile. After image data are captured and stored, the automatic focus software processes the image data with a histogram tool. A histogram of a region of interest (ROI) in an image will illustrate, using a bar graph, the number of pixels at their respective intensity value. The theory behind using a histogram is that as a black and white target image is processed, a more focused image would have more pixels in extremes and fewer pixels in the medium intensity range. However, in order to create an algorithm to focus the imager, a more perceivable pattern to predict the focal distance was needed.

Optionally, and desirably, the intelligent headlamp control (IHC) may focus by capturing individual picture frames and measuring a line profile through a target image consisting of several dark bars separated by different spacing. After finding the line profiles across the target, the slope of the line profiles is calculated to find the sharpness of the edges of the target image. If the target image is sharp (in focus), the peak of the slope will be abrupt and large. If the edges of the target image are blurry, the peak of the slope will be smaller and less abrupt (as can be seen with reference to FIG. 13).

Figure 12:
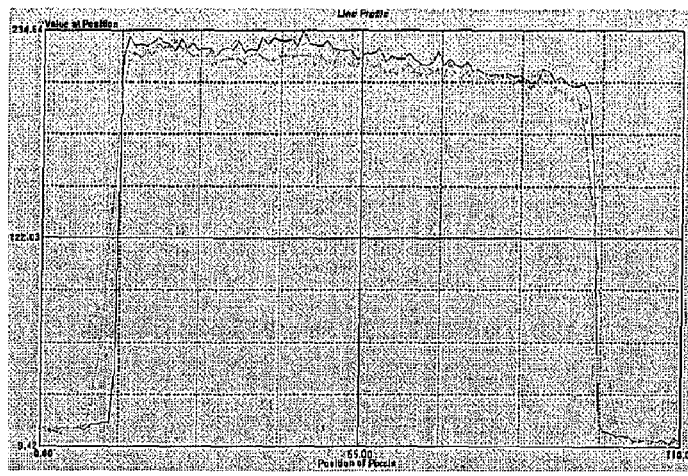
FIG. 12 is a graph of a plurality of line profiles generated in accordance with the present invention.
Figure 13:
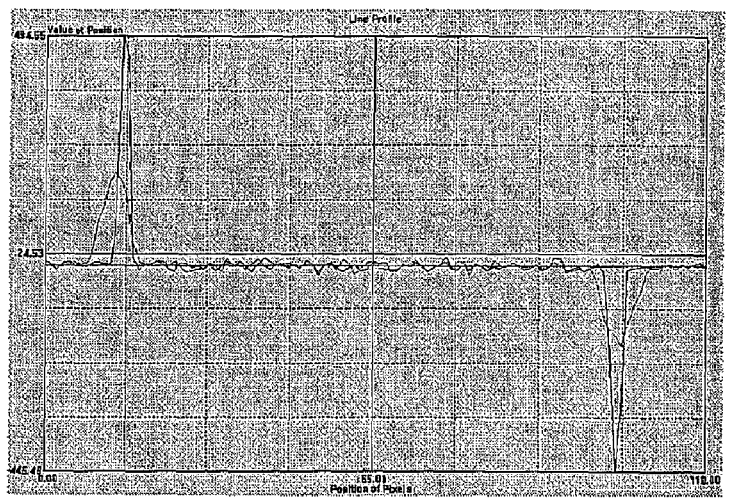
FIG. 13 is a graph of the slope of the line profiles of FIG. 12.

Thus, a line profile tool may be implemented to examine the pixels in a one dimensional mask or line. Such a line profile tool charts the intensity values detected by the imager along the line mask, such as shown in FIG. 12. By using the line profile tool, the edges of the target image are able to be examined. The theory used for the line profile is that as the line mask crossed from a black to white or vise versa target area, the detected intensity value curve would have less of a slope in an unfocused image than a more focused image. The imaging software may include a derivative function to find the slope of the line profile as shown in FIG. 13.

To find the slope, the intensity value of the pixels in the line profile can be calculated in several ways. However, in order to simplify the calculation, the following method to find slope was derived:

$$\frac{Y_n - (Y_{n-1})}{X_n - (X_{n-1})} = S_n;$$

where Y is the intensity value of the pixels 1, 2, 3, 4 ... n, and X is the position of that pixel along the line profile.

Figure 14:
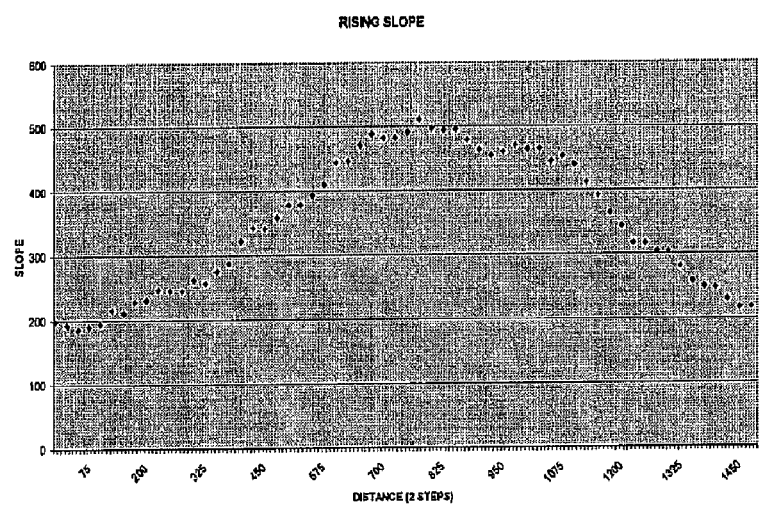
FIG. 14 is a graph of the edge slope vs. focal distance for the focusing algorithm of the present invention.

Once the slope had been determined by the above equation, the maximum and minimum slopes from that image were recorded along with the reference distance away from the starting back focal length as shown in FIG. 14. As the images are processed, a pattern exists that references the maximum and minimum slopes to focal length. This focal length curve is the basis of the software algorithm.

After the slope of the line profile has been plotted, the slope can be plotted against the back focal distance by finding the maximum and minimum slope. As shown in FIG. 14, the correlation between rising edge slopes of several line profiles and back focal distances may be determined. Once near-focus has been achieved, the curve of FIG. 14 provides a reference to the nominal back focal length and creates a quick focus procedure.

After creating several "Slope vs. Distance" curves, the tolerance range for the back focal distance may be approximately ±100 microns from nominal. The tolerance specification given for the lens may be ±210 microns. These tolerance stack-ups require an individual focus for each lens to imager combination.

Using the same line profile slope plot as in FIG. 13, the pixel length of the target image can be found to verify magnification. Since the size of the target is critical in the IHC algorithm, the magnification needs to be verified during focus calculations. To verify the magnification of the lens, the distance, in pixels, is measured between the peak rising edge slope and the peak falling edge slope taken from a target near the center of the field of view. That pixel length is verified against a predetermined value for that target. The production target has not been designed making that pixel length variable to the target.

The software design of the automated focus system is a closed loop software controlled system that utilizes the focus curve as shown in FIG. 14 as a virtual feedback. The design proposal for the focus algorithm created by the author is as follows:

move slide to preset near focus distance (greater than nominal focal distance);
capture image and process line profiles;
increment slide toward imager by 25 steps (microns);
capture image and process line profiles;
repeat steps 3 and 4 one or more times;
calculate present focal distance according to pre-calculated focal curve;
move to nominal focal distance according to pre-calculated focal curve; and
capture image and verify correct focal distance with line profile and histogram.

Since a single line profile may allow for failure in the above process, many line profiles are preferably examined and averaged in order to effectively focus a lens to an imager in a production setting. However, the single line profile used in experimentation exhibits the predictability and repeatability of the focal length curve.

Thus, the software needed to control the auto-focus system should accomplish three things: (1) control the imager; (2) calculate image data; and (3) control the slide table for adjustment. In order to control the imager, the digital video signal from the imager may be coming in through USB, and the software may capture individual frames for calculation upon command. The software also may be capable of reading and writing exposure and gain values for image capture.

The GUI must be able to interactively place and store multiple line ROI's in order to take measurements across the image. Line profiles that correlate with the line ROI's are calculated to find the measure of focus at that specific position. The derivative of each line profile is taken in order to find the slope of the line profile. After these calculations are complete for one image, the peak slopes from each line profile will be averaged together. This number will be compared to a stored table that the program will be able to access in order to find the approximate distance (number of steps) away from nominal focus. After the nominal focus has been reached by means of line profile, the GUI is able to calculate histograms from multiple rectangular ROI's. These histograms may reveal the percentage of data between the two peaks of the histograms, and the control may average that percentage to give a validation to the line profile. The software and control are further able to either virtually or physically interface to the slide controller package in order to input distances and command operations to the slide controller.

After completing several iterations of the focus experiment, several conclusions were made. The target design should have a white object on a black background with angled edges by which line profiles and histograms may discern a sharp focused edge. The histogram method of detecting focus was adequate for detecting focus. However, this method required the motion control to step through many increments of focal length until the histogram criteria reached acceptable limits. Although this method would be adequate and relatively simple to implement, the line profile method revealed a more calculable and immediate pattern of focus.

The line profile method of measuring focus is readily chartable and predictable across the focal distance range. However, although the boundary region between a white and black target may be readily examined, whereby the sharpness of the target is only measured at that point in the target image, more line profiles may be needed to be performed across the image for real-world or non black and white target applications.

Thus, the mathematical algorithm and the curve data methodology discussed above may be implemented as a focus algorithm for present and future forward facing imager systems (and optionally rearward facing imager systems and/or sideward facing imager systems and the like). Although each imager and lens combination will have its own focus curve data, the initial data collection will be a minimal component to the setup procedure. Preferably, the focus can and should be attained by going directly to a calculated focal distance processed by initial out-of-focus images captured by the imager. By using this procedure, attaining focus in a production scenario can be greatly hastened.

Real lenses do not typically focus all rays perfectly due to spherical or other aberrations, diffraction effects from wave optics and the finite aperture of the lens, resulting in an unfocused image with a circle of confusion CL, which is an essentially constant value dependent on lens quality and independent of the distance of the object or the image from the optical center of the lens. The combined effects result in a total circle of confusion CT for images received by the image sensor. Further, the magnification M of the lens is defined as the ratio of the image dimension LI to the object dimension LO. Thus, $M=LI/LO$.

High volume component manufacturing and assembly processes used in the production of optical systems at low cost typically result in part to part variations in their optical characteristics. Additionally, dimensional tolerances are associated with the manufacture of the housing assembly components, with the placement of the imaging array die in its package, and with the placement of the imaging array on the printed circuit board assembly.

Forward facing image capture and signal processing components, such as incorporated in the described AHB control system, may be used to obtain information regarding the location, movement and other characteristics of many objects of relevance to the driving task or operation of the vehicle within the image sensor's field of view, in order to provide additional features and functions, such as, but not limited to, traffic lane detection and lane departure warning, traffic sign recognition, traffic light status detection, fog detection, rain sensing, and/or to supplement or complement the use of other sensors or sensing technologies in the provision of other features and functions such as, but not limited to, adaptive cruise control, pre-crash sensing, pedestrian detection, etc., thus increasing the utility and value of the AHB control system and reducing the cost and space requirements associated with providing each of the features and functions as independent stand-alone systems.

In order to provide optimum detection and characterization of the wide range of objects of relevance or interest in support of the above listed features and functions, amongst others, under a wide range of lighting conditions, it is necessary to consider the requirements of each detection task or group of similar detection tasks.

Typical fixed beam forward lighting systems offer two beam patterns, low and high, with low beam preferably providing the maximum forward and lateral road illumination without causing direct glare to other oncoming or leading vehicle operators such that it may be used in all driving conditions, and high beam preferably providing the maximum forward illumination range with reduced lateral coverage to provide improved forward visibility during night driving when other road users are not present within the extended illuminated region, that is, the region in which they would be subject to glare from the vehicle's high beam headlamps.

Optionally, AHB control systems may incorporate a low speed threshold below which high beam selection is inhibited, in order to avoid activation of high beams when unnecessary, such as when driving at a speed which is safe given the forward visibility provided by the low beam lighting, or when undesirable, such as when driving on city roads.

There are, however, circumstances above this low speed threshold in which it is desirable to maintain, or switch to, a low beam state, even in the absence of other road users in the high beam illumination region. One such circumstance occurs when the vehicle is driven round a bend with a short radius of curvature. In this situation the value of the long range illumination resulting from the use of high beams is reduced since it is not aligned with the vehicle trajectory and typically illuminates off road regions. However, the wider short range beam pattern resulting from the use of low beams can provide increased illumination along the left or right hand curving vehicle trajectory.

Thus, an aspect of the present invention is to improve existing AHB control systems by inhibiting high beam selection when improved relevant road illumination may be provided by the use of low beam headlights, and in particular when the radius of curvature of the current, or instantaneous, vehicle trajectory falls below a predetermined threshold value.

The threshold value is ideally determined based on the specific high and low beam patterns generated by the lighting equipment installed on the vehicle. Additionally, since headlight beam patterns are typically asymmetric, and since the distance to the edge of the road is different when driving round a left or right hand curve, the left and right hand vehicle trajectory radius of curvature threshold values may be different.

The current or instantaneous vehicle trajectory radius of curvature may be obtained or derived from several sources, including, but not limited to steering wheel angular position. The correlation between the vehicle trajectory radius of curvature and steering wheel angular position may be readily established with knowledge of the vehicle mechanical configuration. Thus, steering wheel angular position thresholds which are substantially equivalent to vehicle trajectory radius of curvature thresholds may be derived. Typically, the current, or instantaneous, angular position of the vehicle steering wheel is measured by a rotary encoder, or equivalent sensing device, and is made available to other vehicle control systems either directly or via a vehicle communication bus such as a CAN or the like. By accessing this signal or vehicle bus message, and comparing it to a predetermined threshold, high beam activation may be inhibited to achieve the previously described benefits.

If the vehicle is driven round a long steady curve with a radius of curvature which corresponds to the steering wheel angular threshold, it is possible that the instantaneous steering wheel angular value will oscillate about the angular threshold, resulting in a potentially annoying or inappropriate oscillation between high and low beam states. Thus, the AHB control system may incorporate a time based filter, which may be adaptive, and which may be non-symmetrical, to regulate what might otherwise be frequent annoying or inappropriate switching between the low and high beam states. Depending on the characteristics of the time based filtering system, it may be beneficial to incorporate hysteresis in the angular threshold values, such that the values for left and right increasing steering wheel angles are greater than the values for left and right decreasing steering wheel angles.

Automatic image based high beam control systems (such as described in U.S. Pat. No. 6,097,023, which is hereby incorporated herein by reference in its entirety), in which an image of the scene forward of the vehicle is focused by an optical system, may have a horizontal field of view equal to, but not limited to, approximately +/−22.5 degrees about the imaging system centerline. The image may be focused or imaged onto a rectangular array image capture device such as, but not limited to, a 640×480 CMOS color imager, which captures image data and provides sequential frames of data indicative of the light energy reflected or emitted by objects in the region subtended by each element of the array. The image capture rate may be at a rate in the range of about 5 to 120 times per second or more, with processing being performed on the data to determine the presence, location and characteristics of objects within the monitored scene and to determine characteristics of the monitored scene, such as general illumination level, and to utilize several defined regions of the monitored scene for several different purposes. For example, the region of the scene which generally corresponds to the region of influence of the vehicle high beam pattern, may be used to determine the need to inhibit high beam activation if other road users are detected within that region. The regions to the left and right of the first region may be used to anticipate the upcoming entry of other road users into the first region in order to facilitate a rapid and appropriate response upon entry or just prior to entry of the first region. The upper central region of the monitored scene may be used to determine ambient lighting conditions such that a first threshold may be established below which low beam headlights are activated, and a second threshold may be established above which high beam activation may be inhibited, while the lower horizontal portion of the ambient lighting condition detection region may be used to detect urban lighting conditions or the like. Other processing of the captured image data may be implemented depending on the particular application of the image sensor and processor, while remaining within the spirit and scope of the present invention.

While the segmentation of the monitored scene into fixed regions, such as described above, provides many benefits and efficiencies to the image processing routines used to characterize vehicular light sources, ambient lighting conditions, and non-vehicular light sources etc., they only provide optimal performance when they are appropriately aligned with the monitored scene, such as when driving on a flat straight road. Much of the typical driving experience, however, is on curved and undulating roads. It is, therefore, desirable to have dynamic segmentation of the monitored scene such that the various regions employed align appropriately according to the upcoming road topology and geometry.

An additional aspect of the present invention is to improve the performance of AHB control systems by providing a dynamic segmentation of the monitored scene.

When driving on a curved road, it is beneficial to extend the region used to detect and monitor vehicular light sources in the direction of road curvature in order to provide a sufficiently early detection of other road users and thus the inhibition of high beams. This region may be extended in accordance with the vehicle trajectory radius of curvature as determined by the steering wheel angle or other means as previously described. Additionally, the upcoming road condition may be anticipated by other means, such as vehicle pitch as may be monitored by an accelerometer, combination of accelerometers or other means, such as by detection of vehicle roll, visible horizon tilt and/or yaw detection and/or in response to a GPS output or the like.

An additional aspect of the present invention is to improve the performance of AHB control systems, when used in conjunction with adaptive forward lighting (AFL) systems, by actively changing the region of high beam inhibit in response to the vehicle trajectory radius of curvature, in order that it corresponds to the current region of influence of the high beam pattern.

Typical AFL systems are responsive to the vehicle trajectory radius of curvature and provide improved road surface illumination when driving on curved roads by mechanically, or otherwise, adjusting the beam direction or providing supplementary illumination in the direction of the curve. While this provides a solution to the problem addressed above for fixed beam systems, it introduces a shortcoming for a typical fixed beam high beam control system when used to control high beam selection in an AFL system.

While the detection of leading and on-coming/approaching vehicles occurs across a wide field of view, the inhibition of high beam selection occurs in a narrower fixed region which corresponds to the region of influence of the fixed high beam pattern. When driving around a curve with an AFL system, the region of influence of the adaptive high beam pattern is extended in the direction of the curve, thus reducing the effective response time to a vehicle entering the region of high beam inhibit from the direction of the road curvature. It is, therefore advantageous to modify the region of high beam inhibit in correspondence with the modified high beam pattern.

While this may be accomplished through image processing and scene analysis, it is preferable, in order to minimize the complexity, and therefore to minimize the cost of implementation, of the image processing algorithms employed, to use a signal indicative of the vehicle trajectory radius of curvature or the AFL system beam direction control signal. As previously described, the steering wheel angle may be most conveniently used since it correlates to the vehicle trajectory radius of curvature and is commonly available from the vehicle data bus. The region of high beam inhibit may be adjusted in a continuous fashion in correspondence with the instantaneous high beam direction, or it may be adjusted in one or more steps according to one or more steering wheel angle threshold values.

An additional aspect of the present invention is to improve the performance of existing AHB control systems by improving the characterization of non vehicular light sources when driving on curved roads.

In order to enhance AHB control system performance, it is desirable to provide accurate detection and characterization of other vehicular road users in order to assure the appropriate inhibition of high beam use. Additionally, all other light sources within the monitored scene may be characterized as non-vehicular in order to enhance or maximize forward vision by enabling high beams whenever appropriate and also to avoid the annoyance caused to the user by inappropriate returns to low beams due to the false characterization of non-vehicular light sources as vehicular sources.

Spatial, spectral and temporal techniques are typically used to aid in the appropriate characterization of light sources. It is, however, particularly challenging to correctly characterize light sources when driving round road curves which are provided with reflective signs to indicate road curvature. To achieve the greatest visibility of these signs or reflectors, they are typically located and oriented to provide the maximum possible reflection of light from the host vehicle headlights, that is, at a height above ground level which is similar to that of typical vehicle lights and oriented such that they reflect light from the headlight beams directly back towards the host vehicle as it progresses around the bend. Thus, the spectral and geometric characteristics and locations of these signs or reflectors may be similar to that of other vehicles traveling along the curve or bend in the road.

An additional aspect of the present invention is to improve the performance of existing AHB control systems by providing an automatic repeating alignment of the sensor to the vehicle centerline and the horizontal plane such that the various regions of interest within the scene monitored by the sensor are optimally maintained regardless of vehicle and high beam control system module geometric manufacturing and assembly tolerances, and other sources of misalignment such as vehicle attitude variations due to a wide range of possible vehicle loading conditions.

In order to take advantage of the environmental protection offered by the vehicle cabin, the frequently cleaned optically clear path offered by the vehicle windshield (which is cleaned or wiped by the windshield wipers when the wipers are activated), and the relatively high vantage point offered at the upper region or top of the windshield, AHB control systems are preferably mounted centrally on the upper inside surface of the front windshield of a vehicle and with a forward field of view through the region cleaned or wiped by the windshield wipers.

Typical vehicle body structures, windshields and assembly systems each contribute to the geometric tolerance associated with the surface to which the AHB control system module is attached. The module also has some degree of geometric tolerance associated with its components and assembly methods. It is not unusual to encounter a total stack up of tolerances which result in a potential vertical and horizontal misalignment of +/−2 degrees from the theoretically ideal condition. This is a significant value and may result in errors in determining lane widths and object sizes and distances and the like.

It is known to provide a mechanical adjustment means to allow for the correction of this misalignment at the installation of the AHB control system to the vehicle. This is, however, often undesirable since it often is expensive to apply manual labor to the alignment of components on each vehicle equipped with an AHB control system on the vehicle assembly line. It is additionally undesirable since the alignment procedure is subject to operator error.

Also, during the lifetime of the vehicle the windshield may be damaged and require replacement. In such an event it would be necessary, and likely at an unacceptable cost, to provide the alignment techniques, tools and equipment to every service operation that may be required to replace a windshield and remount the AHB control system module in order to return the vehicle to its original performance level.

Additionally, in normal use, a typical vehicle experiences many different loading conditions which cause it to adopt a wide range of pitch and roll attitudes, causing an AHB control system which is attached to the vehicle to view the forward scene from perspectives different from the ideal, or initially considered design condition, potentially resulting in different headlight actuation decisions than contemplated by the original system specification.

Thus, it is beneficial for an AHB control system to include a feature which automatically compensates for an initial misalignment condition and additionally is capable of correcting for temporary vehicle conditions and re-installation misalignments which may occur during the use of the vehicle.

In order to achieve optimum performance of the AHB control system, it is desirable to determine which of the array elements of the image capture device fall into each of the defined regions. Since the regions are defined relative to the forward scene, it is desirable to determine a particular point within the forward scene and to relate that point to a particular array element of the image capture device.

The particular point in the forward scene may be defined as a particular distant point which lies on the forward extended vehicle centerline on the horizontal plane which passes through the center of the optical system associated with the image capture device. When driving on a substantially flat and substantially straight road, the distant point may be the point within the forward scene at which the headlights of an oncoming vehicle or the tail lamps of a slower leading vehicle are first detected. As the distance between the host and target vehicles decreases, the image of the target vehicle expands within the imaged scene, towards the left if traveling in a leftward lane, centrally if in the same lane, and towards the right if traveling in a rightward lane. Thus the described distant point may be called the focus of expansion or FOE.

In order to determine the imaging array element or pixel which subtends the FOE in the as assembled and as loaded vehicle, it is necessary to identify the array element which first detects a new light source, which has the potential to be a vehicular source, within that region of the monitored scene which could potentially contain the FOE, to continue to track the light source as it expands in the image as the distance between the detected source and the host vehicle decreases until it is confirmed that the source is vehicular, and to monitor the host vehicle trajectory until it reaches the point in the road where the new light source would have been initially detected in order to confirm that the road traveled for the duration of the monitoring period was substantially flat and substantially straight. If it is determined that the point or light source is a vehicle and the host vehicle and approaching vehicle are traveling along a substantially flat and substantially straight road, the location of the initial distant point or FOE may be compared to an expected location and the axis of the imaging system may be adjusted accordingly so that the imaging system is directed at the desired or appropriate or optimal angle relative to the vehicle. Optionally, the imaging system may be adjusted in response to a detection of lane markers along a straight and/or flat road, and/or pitch information from a bus or accelerometer and/or roll information from an accelerometer or bus information. Optionally, the system may only monitor for new light sources when the steering wheel angle or steering angle (SA) is approximately 0 degrees, such as when the steering angle is about 0 degrees +\−0.1 degrees or other threshold angle. Thus, adjustment and/or alignment of the image sensor may occur by tracking movement of light sources through the images when the vehicle is traveling substantially straight, so that the control may compare the tracked light sources to expected locations and paths through the captured images as the vehicle moves along the substantially straight path and may adjust the field of view or viewing angle of the image sensor accordingly.

An additional aspect of the present invention is to improve AHB control systems by providing a detection of left and right hand road systems and an automatic configuration to assure appropriate left or right hand operation. AHB control systems are often installed on both left and right hand drive vehicles and may be configured differently for use on left and right hand drive road systems, preferably having an asymmetric response to activity within the monitored scene. It is possible to configure the system to operate on either a left or right hand drive vehicle and to supply the system to the vehicle assembly plant for installation on a corresponding either left or right hand drive vehicle. In such cases it is desirable to identify the AHB control system module with a particular part number in order to assure the installation of the correct configuration, which results in part number proliferation and the potential for operator error, either at the module manufacturing location where the wrong label may be attached to the product, or at the vehicle assembly plant, particularly if left and right hand drive vehicles are built on the same assembly line, where the wrong part may be selected for installation.

In order to reduce part number proliferation, it is possible to provide a switch on the AHB control system module in order to configure it for operation on a left or right hand drive vehicle. This solution, however, is also subject to operator error and may result in incorrect and inappropriate control of the vehicle high beams during nighttime driving. Additionally, during the normal use of a right hand drive vehicle, it may be driven on a left hand drive road system for a period of time before returning to a right hand drive road system and vice versa, such as when taking a vehicle by ferry or Channel tunnel from the United Kingdom to mainland Europe for vacation or in the course of business. Again it is possible to provide a switch to allow the vehicle operator to configure the system appropriately for the country of use, however, this is inconvenient and may result in inappropriate high beam activation in the event that the operator forgets to, or is unaware of the need to switch to the alternate configuration, or is unaware of the availability of a reconfiguration switch. Thus, there is a need to provide an automatic configuration of AHB control systems such that they analyze the monitored scene, recognize a left or right hand drive road system and self configure accordingly.

The system may track the light sources and adjust the image sensor only when the steering angle is within a threshold value of straight or substantially straight, in order to avoid misinterpretation of source locations. Also, the system may take into account the environment at which the vehicle is traveling, and may not track and adjust when the vehicle is traveling in high lighting environments, such as cities and the like, and may function when there are limited other light sources in the forward field of view. The system may also take into account the speed of the vehicle and thus the speed of the light moving through the captured images.

Optionally, when the vehicle is being passed on tight curves or the like, the control may determine when to adjust the headlamps of the vehicle in response to the location and departure of the passing vehicle's taillights within the field of view. For example, the control may take into account situations when the forward vehicle departs the field of view while the steering angle of the subject vehicle remains relatively constant, and may adjust the headlamps accordingly. Such tracking may also provide an indication that the road continues to curve ahead of the subject vehicle, and may provide information useful in conjunction with an adaptive cruise control (ACC) system and/or a lane departure warning (LDW) or the like.

Adaptive Front Lighting vehicles can illuminate curved road areas and vehicles that previously were not illuminated very well. The AHBC algorithm could, at significant expense and speed penalties, decide when the vehicle was on a curve and change its operation. If the AHBC system could use steering wheel angle (SWA) from the automobile bus, it could react significantly faster, with fewer mistakes, without the calculation penalties of internal SWA calculation.

Figure 9:
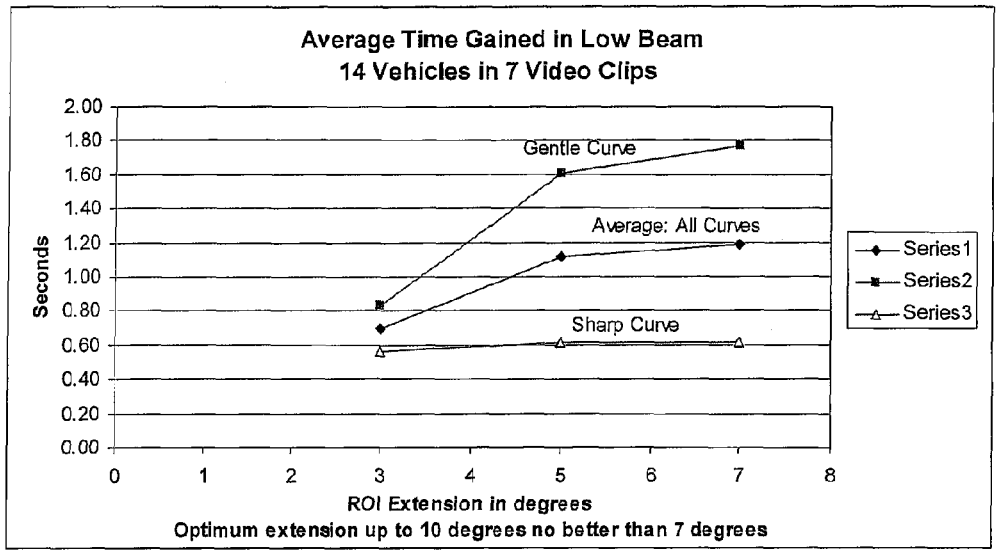
FIG. 9 is a chart showing the region of interest and average time gained in low beam for several vehicles as the vehicles travel around different degrees of curvatures in the road.
Figure 10:
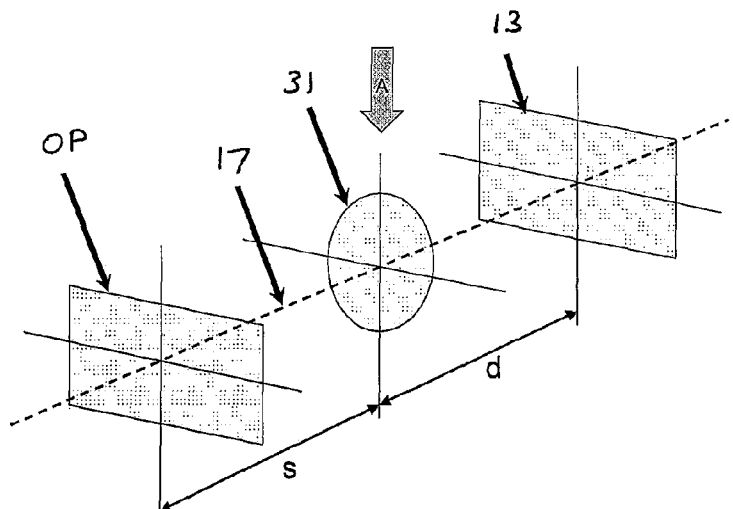
FIG. 10 is a perspective view of a lens and image sensing device of the present invention.

We have done several studies on how the steering wheel angle will improve AHBC functionality when used with AFLS. For example, 14 vehicles in 7 video clips which had both AFLS cars and standard cars were studied. These clips showed vehicles traveling on a curve and were examined to determine how to better detect these vehicles. The region of interest was extended manually in the direction of the curved travel. The SWA was not used during such examination and evaluation, but it is envisioned that the use of steering wheel angle would allow these results to be done automatically. Based on such evaluations, the optimum size and location of the region of interest (ROI) may be found. The ROI is the vehicle processing region. Surprisingly (and as shown in FIG. 9), the optimum ROI change was not a linear function of the SWA size. It was just a simple rule to extend the ROI one amount in the curve direction. During a sharp turn of the vehicle, the vehicle is seen for a short time and for gentle curves the vehicle is seen for a longer time. Results vary with the orientation of the target vehicle with respect to the host vehicle. This is related to the beam intensity pattern.

The smaller amount of gained low beam time on a sharp curve is not to be belittled. The total time that the vehicle was visible in the imaging system on sharp curves averaged around 3-4 seconds. The addition of 0.6 seconds of low beam time is significant since these vehicle detections usually only had a couple seconds of low beam, so the added time is a significant benefit. For the gentle curves the vehicles were visible in the scene for longer, and were detected in low beam for about 1.6 seconds more, thus the added time was significant.

In the future when more target vehicles have adaptive front lighting, this effect may not be so static. Then the ROI may need to be changed as a function of the steering wheel angle. The desired approach was to extend the ROI 5 or 6 degrees in the direction of the curve denoted by the steering wheel angle. With no or small SWA, the ROI is unchanged. This approach is enough to provide significant benefit for the AHBC vehicle with AFLS. The AFLS system does point the headlights in the direction of the curve and this use of SWA will allow the quicker detection of the target vehicle so that the effect of the AFLS is minimized for other drivers. The other vehicles will not get as much unexpected glare at unexpected angles on a curve, because they will be detected sooner by the host AHBC vehicle.

Optionally, the SWA may be used to filter out the false alarm targets from reflectors and house and yard lights on curves. When the vehicle is driven along the road, the system does not know how the road curves ahead and if it did, such as through SWA, the system could better filter out such false targets. This is particularly evident when the false target is straight ahead, while the road curves. In such cases, the false target is in the same position as a real vehicle. With the use of the steering wheel angle, this false alarm can be minimized, and it is estimated that at least about a third of these kinds of false alarms could be eliminated. These also are the most resistant false alarms since they look the most like real car lights.

Finally, the use of SWA could allow us to better filter out the non-straight roads that should be ignored to adapt the focus of expansion. The system can accumulate the focus of expansion data when it detects the lane markers, and may only accumulate when the FOE is close enough to the manufacturing value. The system could better filter out these curved road times and should allow the system to get a better, quicker, measure of the real FOE for a given key cycle.

Therefore, the use of SWA will allow quicker use of low beams on curves where the AFLS system will otherwise glare opposing vehicles more than the non-AFLS vehicle. The detection time, when low beam is on, may preferably increase by about 30 percent or more. The use of SWA will also allow better filtering out of noise sources which falsely trigger low beam, and it will more quickly provide adaptive focus of expansion in general driving.

The imaging sensor for the headlamp control of the present invention may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 6,946,978; 7,004,606; 5,550,677; 5,760,962; 6,097,023; 5,796,094 and/or 5,715,093; and/or U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149; and/or Ser. No. 11/105,757, filed Apr. 14, 2005 by Schofield et al. for IMAGING SYSTEM FOR VEHICLE, and/or PCT Application No. PCT/US2003/036177 filed Nov. 14, 2003, published Jun. 3, 2004 as PCT Publication No. WO 2004/047421 A3, which are all hereby incorporated herein by reference in their entireties.

Optionally, the imaging sensor may be suitable for use in connection with other vehicle imaging systems, such as, for example, a blind spot detection system, where a blind spot indicator may be operable to provide an indication to the driver of the host vehicle that an object or other vehicle has been detected in the lane or area adjacent to the side of the host vehicle. In such a blind spot detector/indicator system, the blind spot detection system may include an imaging sensor or sensors, or ultrasonic sensor or sensors, or sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; and/or 5,786,772, and/or U.S. patent application Ser. No. 11/315,675, filed Dec. 22, 2005; and/or Ser. No. 11/239,980, filed Sep. 30, 2005, and/or U.S. provisional applications, Ser. No. 60/696,953, filed Jul. 6, 2006; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610;

6,757,109; and/or 7,005,974, and/or of the rain sensors described in U.S. Pat. Nos. 6,250,148 and 6,341,523, and/or of other imaging systems, such as the types described in U.S. Pat. Nos. 6,353,392 and 6,313,454, and U.S. patent application Ser. No. 10/422,512, filed Apr. 24, 2003, now U.S. Pat. No. 7,123,168, with all of the above referenced U.S. patents, patent applications and provisional applications and PCT applications being commonly assigned and being hereby incorporated herein by reference.

Optionally, the mirror assembly and/or accessory module or windshield electronics module may include one or more displays, such as for displaying the captured images or video images captured by the imaging sensor or sensors of the vehicle, such as the displays of the types disclosed in U.S. Pat. Nos. 7,004,593; 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/226,628, filed Sep. 14, 2005 by Kamer et al.; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY, and/or PCT Application No. PCT/US03/40611, filed Dec. 19, 2003 by Donnelly Corp. et al. for ACCESSORY SYSTEM FOR VEHICLE, and/or PCT Application No. PCT/US2006/018567, filed May 15, 2006 by Donnelly Corp. et al., which are all hereby incorporated herein by reference, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and/or U.S. patent application Ser. No. 10/538,724, filed Jun. 13, 2005 by Hutzel et al. for ACCESSORY SYSTEM FOR VEHICLE; and/or Ser. No. 11/284,543, filed Nov. 22, 2005, now U.S. Pat. No. 7,370,983, and/or U.S. provisional applications, Ser. No. 60/732,245, filed Nov. 1, 2005; Ser. No. 60/759,992, filed Jan. 18, 2006; and/or Ser. No. 60/836,219, filed Aug. 8, 2006 by Weller et al. for INTERIOR REARVIEW MIRROR ASSEMBLY WITH DISPLAY, which are hereby incorporated herein by reference.

The imaging sensor may be incorporated at or in an accessory module or windshield electronics module (such as described above), or may be incorporated at or in an interior rearview mirror assembly of the vehicle, while remaining within the spirit and scope of the present invention. Optionally, the mirror assembly and/or module may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; and/or 5,669,698, and/or U.S. patent application Ser. No. 10/054,633, filed Jan. 22, 2002, now U.S. Pat. No. 7,195,381; and/or Ser. No. 10/933,842, filed Sep. 3, 2004 by Kulas et al. for INTERIOR REARVIEW MIRROR ASSEMBLY, now U.S. Pat. No. 7,249,860, which are hereby incorporated herein by reference, may be included in the mirror assembly or module. The illumination sources and/or the circuit board may be connected to one or more buttons or inputs for activating and deactivating the illumination sources. Optionally, the mirror assembly or module may also or otherwise include other accessories, such as microphones, such as analog microphones or digital microphones or the like, such as microphones of the types disclosed in U.S. Pat. Nos. 6,243,003; 6,278,377; and/or 6,420,975, and/or in PCT Application No. PCT/US03/308877, filed Oct. 1, 2003 by Donnelly Corp. et al. for MICROPHONE SYSTEM FOR VEHICLE. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, transmitters and/or receivers, such as for a garage door opener or a vehicle door unlocking system or the like (such as a remote keyless entry system), a digital network, such as described in U.S. Pat. No. 5,798,575, a memory mirror system, such as disclosed in U.S. Pat. No. 5,796,176, a hands-free phone attachment, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005 by O'Brien et al. for TIRE PRESSURE ALERT SYSTEM, now U.S. Pat. No. 7,423,522, and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly or module may include one or more user inputs for controlling or activating/deactivating one or more electrical accessories or devices of or associated with the mirror assembly or module or vehicle. The mirror assembly or module may comprise any type of switches or buttons, such as touch or proximity sensing switches, such as touch or proximity switches of the types described in PCT Application No. PCT/US03/40611, filed Dec. 19, 2003 by Donnelly Corporation for ACCESSORY SYSTEM FOR VEHICLE; and/or U.S. Pat. Nos. 6,001,486; 6,310,611; 6,320,282; and 6,627,918; and/or U.S. patent application Ser. No. 09/817,874, filed Mar. 26, 2001 by Quist et al. for INTERACTIVE AUTOMOTIVE REARVISION SYSTEM, now U.S. Pat. No. 7,224,324; Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924; Ser. No. 10/933,842, filed Sep. 3, 2004 by Kulas et al. for INTERIOR REARVIEW MIRROR ASSEMBLY, now U.S. Pat.

No. 7,249,860; Ser. No. 11/021,065, filed Dec. 23, 2004, now U.S. Pat. No. 7,255,451; and/or Ser. No. 11/140,396, filed May 27, 2005, now U.S. Pat. No. 7,360,932, which are hereby incorporated herein by reference, or the inputs may comprise other types of buttons or switches, such as those described in U.S. patent application Ser. No. 11/029,695, filed Jan. 5, 2005, now U.S. Pat. No. 7,253,723; and/or Ser. No. 11/451,639, filed Jun. 13, 2006, which are hereby incorporated herein by reference, or such as fabric-made position detectors, such as those described in U.S. Pat. Nos. 6,504,531; 6,501,465; 6,492,980; 6,452,479; 6,437,258; and 6,369,804, which are hereby incorporated herein by reference. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; and 5,798,688, and/or U.S. patent application Ser. No. 10/770,736, filed Feb. 3, 2004, now U.S. Pat. No. 7,023,322; and/or U.S. provisional applications, Ser. No. 60/502,806, filed Sep. 12, 2003 by Taylor et al. for GARAGE DOOR OPENING SYSTEM FOR VEHICLE; and Ser. No. 60/444,726, filed Feb. 4, 2003 by Baumgardner et al. for GARAGE DOOR OPENING SYSTEM FOR VEHICLE, which are hereby incorporated herein by reference. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; 6,477,464; 6,678,614; and/or 7,004,593, and/or U.S. patent application Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/964,512, filed Oct. 13, 2004, now U.S. Pat. No. 7,308,341; and/or PCT Application No. PCT/US03/40611, filed Dec. 19, 2003 by Donnelly Corporation et al. for ACCESSORY SYSTEM FOR VEHICLE, and/or PCT Application No. PCT/US03/308877, filed Oct. 1, 2003 by Donnelly Corp. for MICROPHONE SYSTEM FOR VEHICLE, which are all hereby incorporated herein by reference.

Optionally, the accessory module may utilize aspects of other accessory modules or windshield electronics modules or the like, such as the types described in U.S. patent application Ser. No. 10/958,087, filed Oct. 4, 2004 by Schofield et al. for VEHICLE ACCESSORY MODULE, now U.S. Pat. No. 7,188,963; and/or Ser. No. 11/201,661, filed Aug. 11, 2005, now U.S. Pat. No. 7,480,149, and/or U.S. Pat. Nos. 7,004,593; 6,824,281; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 by Donnelly Corp. et al. for ACCESSORY SYSTEM FOR VEHICLE, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference.

The reflective element of the rearview mirror assembly of the vehicle may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. patent application Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004, now U.S. Pat. No. 7,255,451; Ser. No. 11/226,628, filed Sep. 14, 2005, and/or PCT Patent Application No. PCT/US2006/018567, filed May 15, 2006 by Donnelly Corp. et al., which are all hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9, 2003 by Donnelly Corp. et al. for MIRROR REFLECTIVE ELEMENT ASSEMBLY, which are all hereby incorporated herein by reference.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. patent application Ser. No. 11/021,065, filed Dec. 23, 2004 by McCabe et al. for ELECTRO-OPTIC MIRROR CELL, now U.S. Pat. No. 7,255,451; and/or Ser. No. 11/226,628, filed Sep. 14, 2005, which are hereby incorporated herein by reference. Optionally, the reflective element may include indicia formed at and viewable at the reflective element, such as by utilizing aspects of the reflective elements described in PCT Patent Application No. PCT/US2006/018567, filed May 15, 2006 by Donnelly Corp. et al., which are hereby incorporated herein by reference.

Optionally, the reflective element of the mirror assembly may comprise a single substrate with a reflective coating at its rear surface, without affecting the scope of the present invention. The mirror assembly thus may comprise a prismatic mirror assembly or other mirror having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004, now U.S. Pat. No. 7,249,860, which are hereby incorporated herein by reference. Optionally, the reflective element may comprise a conventional prismatic or flat reflective element or prism, or may comprise a prismatic or flat reflective element of the types described in PCT Application No. PCT/US03/29776, filed Sep. 19, 2003 by Donnelly Corp. et al. for MIRROR REFLECTIVE ELEMENT ASSEMBLY; U.S. patent application Ser. No. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference, without affecting the scope of the present invention.

Changes and modifications to the specifically described embodiments may be carried out without departing from the principles of the present invention, which is intended to be limited by the scope of the appended claims, as interpreted in accordance with the principles of patent law.

The invention claimed is:

1. A headlamp control system for a vehicle, said headlamp control system comprising:
   an imaging sensor, said imaging sensor comprising a two-dimensional array of light sensing photosensor elements, said imaging sensor monitoring a scene forward of the direction of travel of the vehicle;
   a control, said control processing data from said imaging sensor and generating at least one control output;
   selection of a high beam state and a low beam state for a vehicle headlamp of the controlled vehicle being responsive to said control output, selection of the high beam state and the low beam state being determined responsive to a detection of an object of interest;
   said control responsive to a signal indicative of a vehicle speed of the controlled vehicle, said control inhibiting adjustment of the vehicle headlamp from a low beam state to a high beam state when the vehicle speed is below a threshold speed level; and
   said control responsive to data indicative of a vehicle trajectory of the controlled vehicle, said control inhibiting adjustment of the vehicle headlamp from a low beam state to a high beam state when a radius of curvature of the vehicle trajectory is below a threshold value.

2. The headlamp control system of claim 1, wherein said control inhibits adjustment of the vehicle headlamp from a low beam state to a high beam state when the radius of curvature of the vehicle trajectory is below a threshold value and when the speed of the controlled vehicle is above the threshold speed level.

3. The headlamp control system of claim 1, wherein said data indicative of a vehicle trajectory of the controlled vehicle comprises data indicative of a steering wheel angular position.

4. The headlamp control system of claim 3, including hysteresis in angular threshold values for steering wheel angular positions.

5. The headlamp control system of claim 1, including a filter to limit adjustment between the high and low beam states of the vehicle headlamp when the signal indicative of the vehicle trajectory generally oscillates as the vehicle travels along a curve.

6. The headlamp control system of claim 1, wherein a principal beam direction of the vehicle headlamp is adjustable in response to the data indicative of the vehicle trajectory of the controlled vehicle.

7. The headlamp control system of claim 6, wherein said control inhibits adjustment of the vehicle headlamp from said low beam state to said high beam state when the principal beam direction is directed at least partially sidewardly towards a sideward area and when an object of interest is detected within the at least partially sidewardly area illuminated by the vehicle headlamp.

8. The headlamp control system of claim 1, wherein said control receives the data indicative of a vehicle trajectory of the controlled vehicle via a vehicle communication bus.

9. The headlamp control system of claim 8, wherein said vehicle communication bus comprises a CAN vehicle communication bus.

10. The headlamp control system of claim 1, including a time-based filter to limit adjustment between the high and low beam states of the vehicle headlamp when the signal indicative of the vehicle trajectory generally oscillates as the vehicle travels along a curve.

11. The headlamp control system of claim 1, including a filter to limit adjustment between the high and low beam states of the vehicle headlamp when the signal indicative of the vehicle trajectory generally oscillates as the vehicle travels along a curve, said filter being at least one of (i) adaptive and (ii) non-symmetrical.

12. The headlamp control system of claim 1, including dynamic segmentation of the monitored scene.

13. The headlamp control system of claim 12, wherein the region monitored ahead of the controlled vehicle is extended in accordance with the trajectory of the controlled vehicle.

14. The headlamp control system of claim 13, wherein the region monitored ahead of the controlled vehicle is extended in accordance with the radius of curvature of the trajectory of the controlled vehicle.

15. The headlamp control system of claim 14, wherein the region monitored ahead of the controlled vehicle is extended in accordance with the radius of curvature of the trajectory of the controlled vehicle as determined by the steering wheel angle of the controlled vehicle.

* * * * *